US012809051B2

(12) United States Patent
Lellouch et al.

(10) Patent No.: US 12,809,051 B2
(45) Date of Patent: Nov. 24, 2026

(54) HIGH FIDELITY ROBUST ATOM OPTICS

(71) Applicant: The University of Birmingham, Birmingham (GB)

(72) Inventors: Samuel Lellouch, Birmingham (GB); Michael Holynski, Birmingham (GB); Mehdi Langlois, Birmingham (GB)

(73) Assignee: The University of Birmingham, Birmingham (GB)

( * ) Notice: Subject to any disclaimer, the term of this patent is extended or adjusted under 35 U.S.C. 154(b) by 414 days.

(21) Appl. No.: 18/491,841

(22) PCT Filed: Apr. 26, 2022

(86) PCT No.: PCT/GB2022/051048
§ 371 (c)(1),
(2) Date: Oct. 23, 2023

(87) PCT Pub. No.: WO2022/229621
PCT Pub. Date: Nov. 3, 2022

(65) Prior Publication Data
US 2024/0319402 A1 Sep. 26, 2024

(30) Foreign Application Priority Data
Apr. 26, 2021 (GB) ...................................... 2105918

(51) Int. Cl.
*G01V 7/04* (2006.01)
*G21K 1/30* (2026.01)

(52) U.S. Cl.
CPC *G01V 7/04* (2013.01); *G21K 1/30* (2026.01)

(58) Field of Classification Search
CPC ........................................................ G01V 7/00
See application file for complete search history.

(56) References Cited

U.S. PATENT DOCUMENTS 8,941,053 B1 * 1/2015 Biedermann .......... G21K 1/006 356/450
10,371,856 B1 8/2019 Kasevich
(Continued)

FOREIGN PATENT DOCUMENTS

CN 107328355 11/2017
WO 2012090134 A2 7/2012
(Continued)

OTHER PUBLICATIONS

International Search Report and Written Opinion issued in App. No. PCT/GB2022/051048, dated Jul. 8, 2022, 10 pages.
(Continued)

*Primary Examiner* — Walter L Lindsay, Jr.
*Assistant Examiner* — Andrew V Do
(74) *Attorney, Agent, or Firm* — Blueshift IP; Robert Plotkin

(57) ABSTRACT

An apparatus for driving atoms of an atom cloud into a targeted quantum state is provided, the apparatus comprising: an atom source for releasing a cloud of atoms to be driven into a targeted quantum state; a laser system configured to generate a laser beam to be directed onto the atom cloud in use, the laser beam having a frequency corresponding to a resonant frequency of an atomic transition for exciting the atoms into the targeted quantum state; a modulator configured to, in use, modulate the frequency of the laser beam responsive to an input signal; a waveform generator coupled to the modulator and configured to, in use, generate an input signal for the modulator, wherein the input signal is arranged to cause the modulator to modulate the laser light to generate a comb of frequencies around the resonant frequency of the atomic transition, the frequency comb including a plurality of peaks, each peak being separated by a frequency spacing, δω, that is determined based
(Continued)

on a Rabi frequency, Ω, of the atomic transition to drive atoms of the atom cloud into a targeted quantum state.

41 Claims, 6 Drawing Sheets

(56) References Cited

U.S. PATENT DOCUMENTS

| | | | |
|---|---|---|---|
| 2015/0331142 | A1 | 11/2015 | Ammar |
| 2018/0073856 | A1 | 3/2018 | Cundiff |
| 2020/0395726 | A1 | 12/2020 | Lien |

FOREIGN PATENT DOCUMENTS

| | | | |
|---|---|---|---|
| WO | 2013139989 | A1 | 9/2013 |
| WO | 2020124134 | | 6/2020 |

OTHER PUBLICATIONS

Search Report issued in App. No. GB2105918, dated Aug. 31, 2021, 4 pages.

* cited by examiner

No spontaneous emission
Central Field: $P_I = 1$; $\sigma_{pos} = 1mm$; $\gamma = 0$
No Central Field: $\gamma = 0$
$P_{I+1} = 0.7P_I$; $\gamma = 0$
Transition Probability
1.0
0.8
0.6
0.4
0.2
0
Mono
N=3
N=10

$\gamma = 2\pi X7.4KHz$
0
$5\pi$
$10\pi$
$15\pi$
$20\pi$
$\Omega_t t$

Spontaneous emission

HIGH FIDELITY ROBUST ATOM OPTICS

This invention relates to an apparatus for driving atoms of an atom cloud into a targeted quantum state, a method thereof, an atomic interferometer and a gravity sensor.

BACKGROUND

Most quantum technologies rely on the coherent manipulation of atomic states, including for example, atom interferometry which is a technique used for sensing and making precise measurements of physical phenomena. In particular, atom interferometry may be used to accurately measure gravitational acceleration, the gravitational constant, the fine structure constant, and inertial effects such as rotations and accelerations, among other physical phenomena. Quantum gravity sensors generally use laser beams to coherently split, deviate and recombine atomic wave packets. This is done by tailoring the characteristics of those pulses, such as the frequency, intensity or duration of the laser beam to deliver the suited population transfers into their targeted quantum states. In particular, atom interferometers use lasers to interact with states of atoms to split the atomic wavepackets and transfer momentum to the of atoms travelling along different pathways. The separate matter wave beams are later redirected and interfered together, and the resulting interference pattern may be analysed to determine the physical phenomena. Travelling from the initial interaction to the point of interference and observation, the atoms are in quantum superposition. Unlike light, atoms are massive and bear signals from gravitation and other interactions in their interference patterns, which allows highly sensitive measurements of these phenomena to be performed. Indeed, any effect that modifies the potential energy, internal energy, or kinetic energy across the two arms of the interferometer may vary, depending on the configuration of the interferometer, and appear in the interference pattern. For example, by looking at population differences in the atoms in the states shown in the interference patterns, the effect the phenomenon has had on the atoms in the two arms of the interferometer can be revealed.

For illustrative purposes, this is shown in FIG. 1, which is a schematic illustration of atom interferometry showing an atom 10 being subjected to a plurality of light pulses 12, 14 emitted by a laser (not shown), with its quantum states being detected by a detector (not shown) of an atom interferometer. In particular, the atom 10 is subjected to alternating light pulses of $\pi$ and $\pi/2$ light pulses. The atom 10 may be provided in either its ground or excited state, and when subjected to a first $\pi/2$ light pulse 12 at a time=$t_1$, the atomic wave packet is split and deviated into quantum superposition, before being deviated when subjected to a $\pi$ light pulse 14 at time=$t_2$. A second $\pi/2$ light pulse 12 at a time=$t_3$ causes the atomic wavepacket 10 to be recombined, before being detected by two arms of the detector. The internal state atomic populations of the atom 10 give rise to an interference pattern.

It is in the above context that the present invention has been devised.

BRIEF SUMMARY OF THE DISCLOSURE

In accordance with a first aspect of the present disclosure, there is provided an apparatus for driving atoms of an atom cloud into a targeted quantum state, the apparatus comprising: an atom source for releasing a cloud of atoms to be driven into a targeted quantum state; a laser system configured to generate a laser beam to be directed onto the atom cloud in use, the laser beam having a frequency corresponding to a resonant frequency of an atomic transition for exciting the atoms into the targeted quantum state; a modulator configured to, in use, modulate the frequency of the laser beam responsive to an input signal; a waveform generator coupled to the modulator and configured to, in use, generate an input signal for the modulator, wherein the input signal is arranged to cause the modulator to modulate the laser light to generate a comb of frequencies around the resonant frequency of the atomic transition, the frequency comb including a plurality of peaks, each peak being separated by a frequency spacing that is determined based on a Rabi frequency, $\Omega$, of the atomic transition to drive atoms of the atom cloud into a targeted quantum state.

By generating the laser beam with the above frequency comb based on the Rabi frequency, the laser beam is generated to have a polychromatic spectrum including a plurality of peaks with the peaks corresponding to the frequency components peaking in amplitude across the spectrum. By probing an atom cloud with a polychromatic laser beam, the fidelity of the atoms being driven into the targeted quantum state may be increased, as compared with monochromatic laser beams. Here, a monochromatic laser beam corresponds to a laser beam having a frequency spectrum defined by a single frequency that peaks in amplitude. In particular, when a monochromatic laser beam probes an atom cloud, cloud inhomogeneities such as varying atom velocities and positions within the cloud cause varying Doppler shifts and varying experienced laser intensities throughout the cloud, such that the fidelity is reduced since not all atoms will be driven into the targeted quantum state. This in turn reduces the sensitivity of the devices, since errors will arise in the measurements taken due to atoms not being in their targeted quantum state. By contrast, the above polychromatic laser beam helps to deliver pulses that are less sensitive to such cloud inhomogeneities, thereby improving the fidelity. In turn, the sensitivity of devices such as atom interferometers and quantum gravity sensors may be significantly improved, since near 100% of the atom cloud may be in the targeted quantum state, thereby reducing the risk of erroneous measurements arising due to atoms being in inconsistent quantum states. Moreover, the above polychromatic laser beams also offer many practical advantages over other prior art methods to improve the fidelity of the atoms, since the polychromatic laser beams of the present disclosure may be generated with relatively low power and short pulse durations, as compared with the prior art, which is advantageous for large momentum transfer (LMT) schemes.

The frequency spacing, $d\omega$, between each peak may be equal. In doing so, the polychromatic spectrum of the laser beam may include a plurality of equally distributed peaks, which helps to improve the fidelity.

The frequency spacing, $d\omega$, may be determined to be approximately an integer multiple of the Rabi frequency, $\Omega$, associated with each individual peak. By providing a frequency spacing approximately equal to the Rabi frequency, the pulse fidelity may be further improved.

The plurality of peaks may be even in number. The plurality of peaks may include a plurality of pairs of peaks. Each pair of peaks may correspond to two peaks that are equidistant to the centre frequency. The centre frequency may correspond to the midpoint between the lowest frequency peak and the highest frequency peak and may be resonant with the atomic frequency.

The frequency comb may include no peak at a centre frequency of the frequency comb. By providing the frequency comb without a central frequency component, this facilitates in reducing the long-term damping of the oscillations between the two atomic states, which can be useful for LMT purposes.

The peaks may have a predetermined amplitude distribution. In doing so, the frequency comb may advantageously be tailored to optimize the characteristics of the population transfers. The amplitude distribution may include a power decay between adjacent peaks, which helps to smoothly transition atoms into the targeted quantum state with high-fidelity and increased robustness against pulse duration. Alternatively, each peak may be approximately equal in amplitude, which advantageously helps to produce a high-fidelity and very rapid population transfer to the desired state.

The laser beam may be a pulsed laser beam. The pulsed laser beam may have a pulse duration of an order of 1/Ω s. It will be understood that the pulse duration may be tailored according to the amplitude distribution of the peaks. The pulse duration may be determined using numerical simulations based on the predetermined amplitude distribution of the peaks. The pulsed laser beam helps to accurately drive a population of atoms into the targeted quantum state quickly and efficiently.

The laser beam may be for driving atoms into the targeted quantum state with a higher fidelity than a fidelity achieved by a monochromatic laser beam, wherein the fidelity is defined as the maximum population transfer of atoms of the atom cloud being driven into the targeted quantum state. The laser beam may be for robustly driving atoms into the targeted quantum state. The polychromatic laser beam may therefore advantageously help to robustly drive atoms into the targeted quantum state irrespective of the dynamics of each individual atom within the cloud. In doing so, this helps to remove the need for further accounting for effects affecting the dynamics of the cloud in the laser beam, such as cloud expansion, global position or Doppler shifts, tilts, or effects related to platform motion. In doing so, the claimed laser beam provides a cost-effective and efficient means of improving the sensitivity of devices probing atom clouds, by improving the fidelity achieved by the laser beam.

The laser beam may be for driving atoms from the ground state into the excited state. The laser beam may be for driving atoms from the excited state into the ground state. Atoms may therefore advantageously be driven into both the excited and ground states with high fidelity.

The atoms may be arranged to be in the excited state, prior to being probed by the laser beam. The laser beam may be for driving the atoms, arranged in the excited state prior to being probed by the laser beam, into the targeted quantum state with a lower rate of spontaneous emission than a rate of spontaneous emission produced by a monochromatic laser beam. Advantageously, when used on atoms initially prepared in the excited state, the above described polychromatic laser beam may do so not only with high fidelity, but also by suppressing the rate of spontaneous emission of the atoms. In doing so, this beneficially improves how coherently atoms can be manipulated, particularly for long LMT pulse sequences. Spontaneous emission is an undesirable source of decoherence when manipulating atomic internal states, and therefore ultimately limits the timescales over which coherent state manipulation can be performed. By probing an atom initially prepared in the excited state with the above-described polychromatic laser beam, the atom may spend very little time in the excited state. This gives rise to a slower decay of atomic oscillations over time as compared with when a monochromatic laser beam probes the same atoms. Thus, by suppressing spontaneous emission, the sensitivity of atom-based quantum devices may be improved. Moreover, long LMT sequences in the context of atomic interferometry may be achieved, since large populations of atoms may be successfully alternated between the ground and excited states over long sequences of pulses.

The modulator may comprise an acousto-optical modulator, AOM. The waveform generator may comprise an arbitrary waveform generator, AWG, configured to output a radio frequency, RF, signal for determining the frequency modulation of the modulator. The apparatus may further comprise a spectrum analyser. The apparatus may therefore be cost-effective.

The cloud of atoms may be cooled before being probed with the laser beam. By probing a cooled atom cloud with the laser beam, the laser beam may efficiently drive the atoms into the targeted quantum state with high fidelity.

The atom cloud may be driven by the laser beam in a non-cavity environment. As such, the apparatus is not confined to use in a cavity environment.

The laser beam may be generated to have a power equal to or less than 1 W. In doing so, the power required to operate the apparatus in use is significantly less than known techniques that use flat or large laser beams.

A single laser pulse may be configured to drive the atoms into the targeted quantum state. The laser pulse may be configured to have a pulse duration of an order of 1/Ω s. Since the pulse durations are approximately the same as those used for monochromatic laser beams, the polychromatic laser beams may be usable in large momentum transfer schemes, by contrast to known composite pulses, which include a sequence of pulses with different pulse durations.

The atom source may comprise a cloud of Rubidium 87 atoms. The frequency spacing, dω, may be of the order of 100 kHz. The pulse duration may be of the order of $10^{-6}$ s, and preferably in the range of $4\times10^{-6}$ s to $6\times10^{-6}$ s. The laser beam may be for driving atoms into the targeted quantum state with a fidelity equal to or greater than 0.8, and preferably equal to or greater than 0.95.

The atom source may comprise a cloud of Strontium 87 atoms. The laser beam may be for driving an atomic transition at 689 nm. The frequency spacing, δω, may be of an order of magnitude of 100 kHz. The pulse duration may be of an order of $10^{-6}$ s. Alternatively, the laser beam may be for driving an atomic transition at 698 nm. The frequency spacing, δω, may be of an order of magnitude of 1 kHz. The pulse duration May be of an order of $100\times10^{-6}$ s. It will however be understood that the apparatus may be adapted to any atomic species and have the frequency spacing and pulse duration tailored based on the Rabi frequency of the atomic transition of the atomic species being probed.

The frequency spacing, dω, may be less than 1 MHz.

According to a second aspect of the disclosure, there is provided an atomic interferometer comprising an apparatus described herein.

According to a third aspect of the disclosure, there is provided a gravity sensor comprising an apparatus described herein.

According to a fourth aspect of the disclosure, there is provided a method for driving atoms of an atom cloud into a targeted quantum state, the method comprising: generating a laser beam to be directed onto an atom cloud to be driven into a targeted quantum state, the laser beam having a frequency corresponding to a resonant frequency of an atomic transition for exciting the atoms into the targeted quantum state; directing the laser beam through a modulator configured to modulate the frequency of the laser beam responsive to an input signal; generating an input signal input into the modulator to cause the modulator to modulate the laser light to generate a comb of frequencies around the resonant frequency of the atomic transition, the frequency comb including a plurality of peaks, each peak being separated by a frequency spacing that is determined based on a Rabi frequency of the atomic transition; and probing an atom cloud with the modulated laser beam for driving atoms of the atom cloud into a targeted quantum state.

The method may further comprise, prior to generating the input signal, determining the frequency spacing of the frequency comb to be generated. The frequency spacing may be determined based on a Rabi frequency of the atomic transition.

The method may further comprise, prior to generating the input signal, determining an amplitude distribution for the plurality of peaks. The input signal may be generated based on the determined amplitude distribution.

The method may further comprise, by probing the atom cloud, driving the atom cloud into the targeted quantum state with a higher fidelity than a fidelity achieved by a monochromatic laser beam, wherein the fidelity is defined as the maximum population transfer of atoms of the atom cloud being driven into the targeted quantum state.

The method may further comprise, by probing the atom cloud, driving the atom cloud from the ground state into the excited state. The method may further comprise, by probing the atom cloud, driving the atom cloud from the excited state into the ground state.

The method may further comprise, prior to probing the atom cloud, providing the atoms in the excited state. The method may further comprise, by probing the atom cloud, driving the atom cloud into the targeted quantum state with a lower rate of spontaneous emission than a rate of spontaneous emission produced by a monochromatic laser beam.

The method may further comprise, prior to probing the atom cloud, cooling the atom cloud.

BRIEF DESCRIPTION OF THE DRAWINGS

Examples of the disclosure are further described hereinafter with reference to the accompanying drawings, in which.

DETAILED DESCRIPTION

Figure 1:
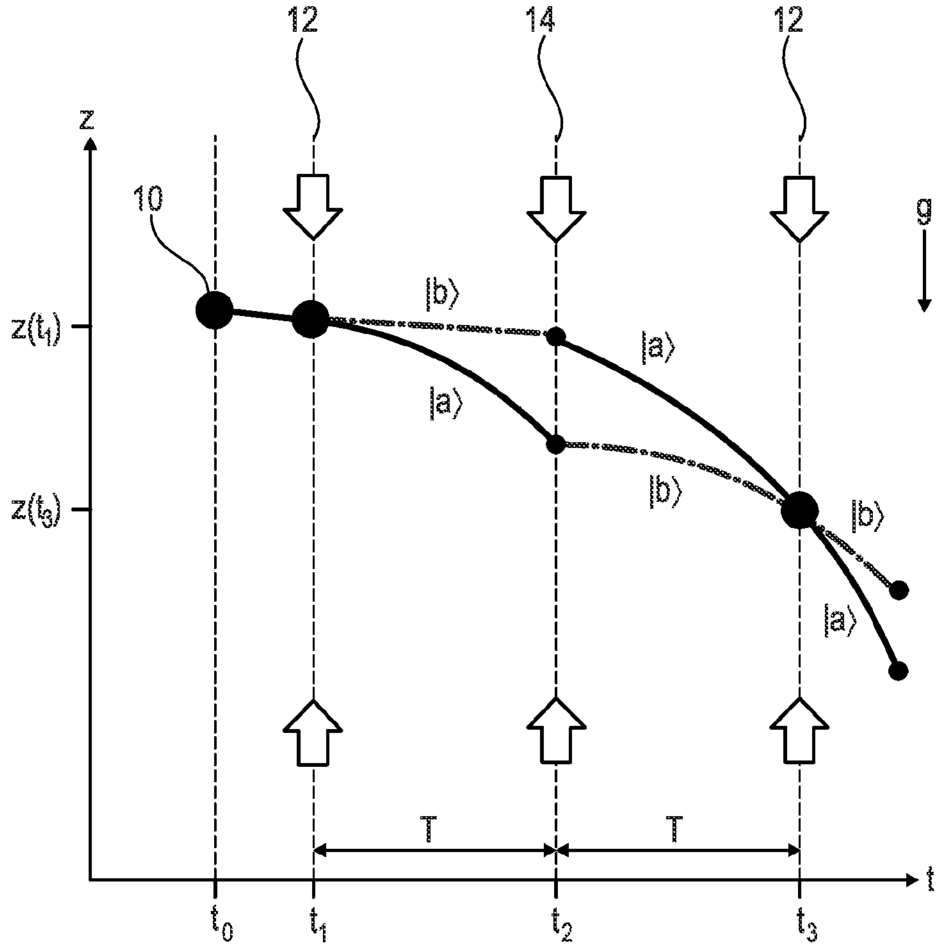
FIG. 1 is a schematic illustration of atoms undergoing atomic interferometry of the prior art.

The present inventors have realised that there is room for improving the fidelity of atoms being probed by laser beams, so that atoms may be coherently manipulated accurately. Qualitatively, the fidelity is defined as the maximum population transfer into the targeted quantum state (a mathematical definition is given in context below). It will be understood that it is important to address an atom cloud with near 100% fidelity so that atoms are in their intended quantum state, in order to reduce errors when probing the atom cloud with an atomic interferometer, gravity sensor or the like. Indeed, fringe contrast, and ultimately sensor sensitivity, are bounded by how the atoms interact with the laser beams. Generally speaking, when being probed by standard laser beams, the atoms in an atom cloud do not achieve high fidelity, due to internal cloud dynamics. In particular, inhomogeneities arise between individual atoms, as a result of varying velocities and positional dispersions within the cloud.

The inventors have particularly realised that it is important to enhance atom interferometry performance by improving the fidelity achieved, particularly for large-momentum transfer (LMT) interferometry, which involves injecting a large number of sequential laser beam pulses into an atom cloud and requires the fidelity to be maintained at ~100% (i.e. that ~100% of the atoms are driven into the targeted quantum state) in order to have a non-zero contrast at the output, regardless of long interferometric sequences, which may result in significant cloud expansion, accumulated Doppler shifts, misalignment-induced drifts, and/or spontaneous emission.

However, whilst a laser beam may be able to reliably drive a single atom into its targeted quantum state, this is not the case for a cloud of atoms. Taking a generic case of a single two-level atom being driven from its ground state |g> into its excited state |e> by a laser beam having a polychromatic field made of N frequency components at frequencies $\omega_i$ with a central laser frequency $\omega_L$, and $\omega_i=\omega_L+\delta\omega_i$, the dynamics of the two-level atom is approximated to be:

$$i\partial_t\begin{pmatrix} c_g \\ c_e \end{pmatrix} = \begin{pmatrix} 0 & \Omega(t)/2, \\ \Omega*(t)/2 & \delta \end{pmatrix}\begin{pmatrix} c_g \\ c_e \end{pmatrix} \text{ with} \quad \text{Equation 1}$$

$$\Omega(t) = \sum_{i=0}^{n} \Omega_i e^{i(\delta\omega_i t+\phi_i)} \quad \text{Equation 2}$$

where $\Omega_i$ is the Rabi frequency of the i-th frequency component, $\phi_i$ is its phase, and $\delta\omega_i=\omega_{at}-\omega_L$ where $\omega_{at}$ is the atomic frequency. The coefficients $c_e(t)$, $c_g(t)$ which parametrise the atomic wavefunction in the basis |e>, |g> fulfil the normalization condition $|c_e|^2+|c_g|^2=1$. It will be understood that although the exact expression of $\Omega_i$ depends on the details of the considered transition, Equation 1 is very general in nature and describes any linear interaction between a two-level atom and an electric field.

It will be understood that Equation 1 describes a coherent evolution without losses. In the presence of spontaneous emission, the dynamics is captured by the optical Bloch equations (OBE), which take here the following form:

$$i\partial_t\rho_{eg} = -\left(i\frac{\Gamma}{2}+\delta\right)\rho_{eg} - \Omega(t)\left(\rho_{ee}-\frac{1}{2}\right) \quad \text{Equation 3}$$

$$i\partial_t\rho_{ee} = -i\Gamma\rho_{ee} - 2iIm[\Omega(t)\rho_{eg}]$$

where $1/\Gamma$ is the lifetime of the excited state. Both Equations 1 and 3 can be numerically solved with some specified initial conditions.

In most situations however, light pulses do not operate on single atoms but on atom clouds, which exhibit both spatial and velocity dispersions. On the one hand, atoms at different spatial positions in the laser beam see different intensities I(r), and thus Rabi frequencies. This amounts to add a position dependence in Equation 2, $\Omega_i\rightarrow\Omega_{i,r}$. On the other hand, atoms with different velocities see different laser frequencies due to the Doppler effect; for an atom of velocity v, each frequency $\omega_i$ of the driving field will be Doppler-shifted by $k_i\cdot v$ (with $k_i$ the corresponding wavevector).

The pulse fidelity is quantitively therefore defined as the cloud-averaged excited-state probability $$F=<P_e(t)>=\int_v\int_r f(r)f_v(v)P_e[t,r,v]d^3vd^3r \quad \text{Equation 4}$$

where f(r) is the cloud spatial distribution, $f_v(v)$ is its velocity distribution, and $P_e[t, r, v]$ is the excited state probability of an atom at position r and velocity v, as obtained by solving Equations 1 to 3 with substitutions $\Omega_i\rightarrow\Omega_{i,r}$ and $\delta\rightarrow\delta-k\cdot v$.

For standard monochromatic pulses, cloud averaging results in a loss of contrast and damping of Rabi oscillations due to dephasings between individual atom dynamics.

Accordingly, when using standard techniques, the light intensity and frequency that each atom sees locally will vary based on their own individual velocity, position, etc. which results in varying Doppler shifts, thereby leading to the atoms being at different quantum states. The inventors have therefore realised that there is a real need for robustly addressing an entire atom cloud with high fidelity, regardless of the internal dynamics of the cloud. Furthermore, such issues are important in addressing the use in applications, particularly those requiring operation on moving platforms. Indeed, this problem is prevalent to all cold-atom based experiments or technologies which rely on the coherent manipulation of atom clouds which have a finite size/temperature, for instance, in atom interferometry and quantum sensing and would be particularly important for reliably performing LMT interferometry.

Whilst the problem has been realised in the wider industry, standard techniques involve circumventing this issue by trying to reduce the effects of cloud inhomogeneities by working in appropriate regimes of operation. For example, one such technique is to work with large or flat beams, but this requires a significant amount of laser power. Another such technique is to work at low temperatures or resort to initial velocity selection, but generally speaking, this technique requires expensive and energy consuming cooling techniques and/or an atom cloud with an insufficient atom number. Yet another technique is to use composite laser pulses that are tailored to be resilient to cloud inhomogeneities. However, this technique suffers from very long pulse durations or corresponding increases in laser power and cost, which makes it difficult to use in practice in LMT schemes, or in the presence of spontaneous emission. The inventors have therefore realised a need for improving the fidelity that a laser beam can achieve for coherent manipulation of atoms.

Furthermore, when a two-level atom is in the excited state, spontaneous emission causes the atom to decay decoherently. This ultimately bounds the sensitivity of quantum-based devices, given that atoms may only be coherently manipulated when they are in their targeted quantum state. In particular, spontaneous emission causes decoherence, which is particularly limiting for the sensitivity of LMT schemes, which typically require high fringe contrast over long sequence durations. Typically, techniques to suppress spontaneous emission involve using very short pulses, but this requires increases in laser power and cost. Other prior art techniques working on two-photon transitions also face significant challenges in their sensitivity, such as the noise arising from the laser phases and propagation delays. The inventors have realised there is a need for suppressing spontaneous emission for coherent manipulation of atoms.

Figure 2:
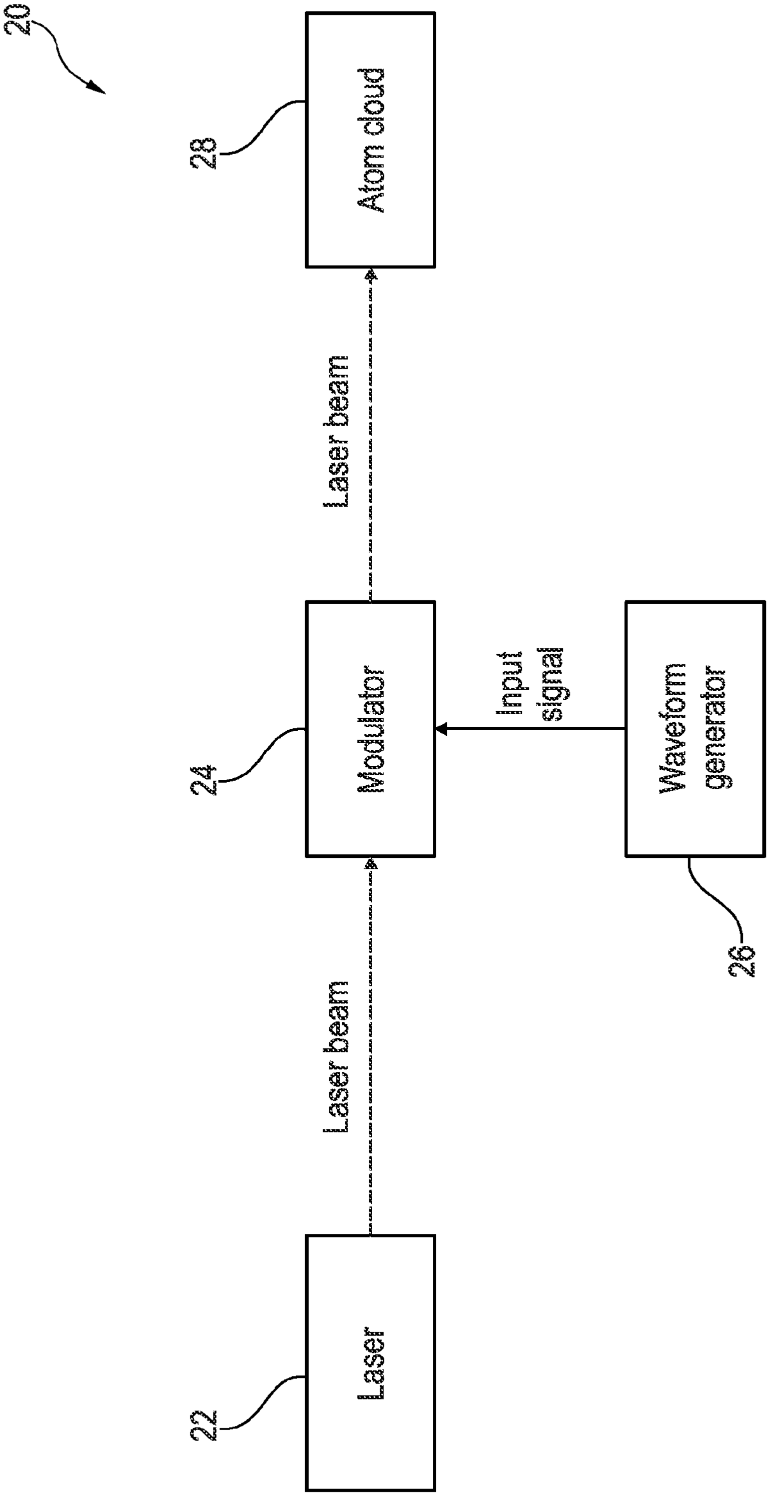
FIG. 2 is a schematic illustration of an apparatus according to a first example of the disclosure.

FIG. 2 is a schematic illustration of an apparatus 20 for driving atoms of an atom cloud into a targeted quantum state, according to a first example of the disclosure. The apparatus 20 includes a laser system 22, a modulator 24, a waveform generator 26 and an atom source.

The laser system 22 may comprise any suitable laser for generating a laser beam. In FIG. 2, the laser beam is denoted by a dashed line. The laser beam generated by the laser system 22 is used to probe an atom cloud 28 which is released from the atom source. Interposed between the laser system 22 and the atom cloud 28 is the modulator 24 which the laser beam is fed through before being directed into the atom cloud. The modulator 24 may be of any suitable type, such as an acousto-optic modulator (AOM), which is configured to modulate the frequency of the laser beam. In particular, the modulator 24 is in electronic communication with the waveform generator 26, from which the modulator 24 receives an input signal based upon which the modulation is performed. Specifically, in response to the input signal, the modulator 24 is arranged to modulate the laser beam to have a frequency comb around the resonant frequency of the atomic transition of the atoms being probed, whereby the frequency comb includes a plurality of peaks, with each peak being separated by a frequency spacing that is determined based on the Rabi frequency of the atomic transition to drive the atoms of the atom cloud into the targeted quantum state. The peaks are frequency components that peak in amplitude in comparison to the other frequencies making up the laser beam spectrum. In doing so, the frequency comb may be considered to exhibit a polychromatic frequency spectrum. It will be understood that the input signal is determined according to the chemical composition of the atom cloud. This will be discussed in further detail below.

The laser system may comprise a seed laser, an amplifier and a harmonic generator. The seed laser is for generating a laser beam, which is output and injected into the amplifier which amplifies the laser beam signal. The amplifier may be an optical amplifier. By seeding the laser beam in this manner, variations in the output energy may be smoothed out, whilst producing high output power, which may be particularly beneficial for performing atom interferometry, particularly for laser pulses. The laser beam having traversed through the amplifier is next input into the harmonic generator, which may be a second harmonic generator or any suitable generator for performing frequency multiplication.

In some examples of the disclosure, the apparatus 20 further includes a spectrum analyser (not shown) arranged to detect the spectra exhibited by the atom cloud, from which the atomic states of the atoms may be determined. The spectrum analyser may be arranged to also determine the atomic states, although this may be performed by an external computer in other example of the disclosure. Accordingly, the results as to whether the atoms of the atom cloud have been driven into the targeted quantum state may be established.

The waveform generator 26 in the first example of the disclosure is an arbitrary waveform generator (AWG) that is configured to produce a radio frequency (RF) signal that sets how the modulator 24 performs frequency modulation on the laser beam. However, the disclosure is not limited to the waveform generator 26 being an AWG, but may be any suitable type configured to generate the input signal for the modulator 24, and similarly, is not limited to the input signal being of an RF type, but may take on any form that can be received by the AOM 24. In some examples of the disclosure, the apparatus 20 further includes at least one attenuator and amplifier through which the signal output by the waveform generator 26 passes before being received by the AOM 24.

The waveform generator 26 of FIG. 2 facilitates in efficiently generating the signal for performing frequency modulation by the modulator 24 which will now be discussed. In the first example of the disclosure, the frequency comb is generated using the waveform generator to include a plurality of equally spaced peaks, such that the frequency spacing between each peak is equal.

As discussed above, the polychromatic frequency spectrum includes a plurality of peaks, which peak in amplitude. FIGS. 3*a* to 3*f* model the fidelity response of a cloud of Strontium 87 atoms on the 689 nm transition having a cloud width of 1 mm to three different laser beams to a standard monochromatic of the prior art denoted by the dotted blue line "mono", a first pulsed polychromatic laser beam including 3 pairs of peaks as generated by the apparatus according to the first example of the disclosure as denoted by the orange line "N=3", and a second pulsed polychromatic laser beam including 10 pairs of peaks as generated by the apparatus according to the first example of the disclosure as denoted by the green line "N=10". Here, a "pair of peaks" corresponds to two peaks that are equidistant to the centre frequency of the frequency comb. The centre frequency may be the midpoint between the lowest frequency peak and the highest frequency peak across the frequency comb. The polychromatic laser beams are generated to be aligned along the z-axis with a Gaussian spatial intensity distribution in the (x,y) plane:

$$I(r) = I_0 \exp^{-(x^2+y^2)/2\sigma_L^2}.$$

Introducing the Rabi frequency associated with the intensity at the centre of the beam, $\Omega_0 = d/\hbar\sqrt{2I_0/c\epsilon_0}$, leads to individual Rabi frequencies $$\Omega_{i,r} = \Omega_{i,0} \exp^{-(x^2+y^2)/4\sigma_L^2}$$

with the normalisation $$\sum_i \Omega_{i,0}^2 = \Omega_0^2.$$

The spectra are also generated with a constant power ratio P between two adjacent pairs of peaks, $$P = \Omega_{i+1,0}^2 / \Omega_{i,0}^2.$$

Figures 3A, 3B, 3C, 3D, 3E, 3F:
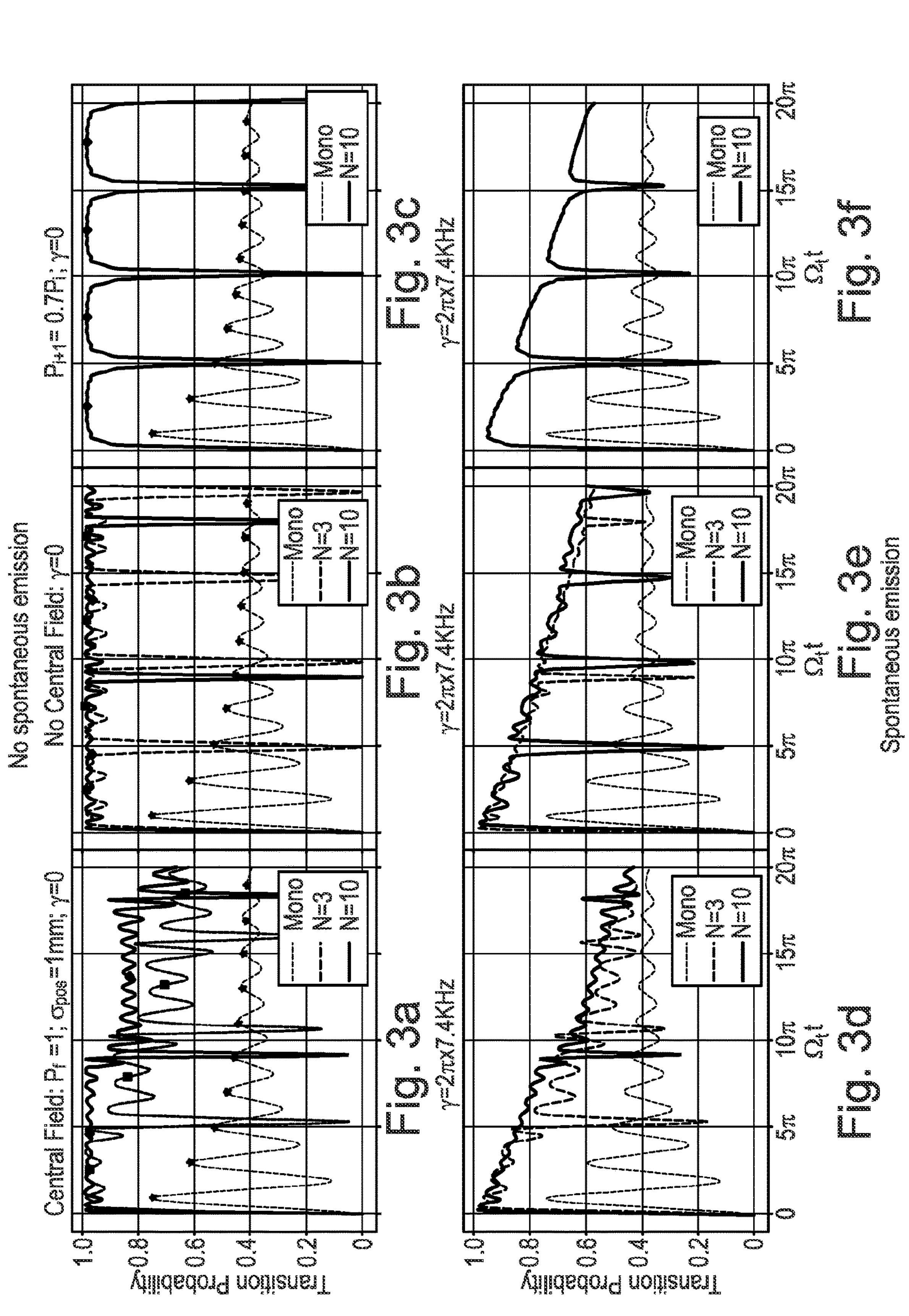
FIG. 3*a* models the fidelity achieved by a standard monochromatic laser beam and two polychromatic laser beams produced by the apparatus of FIG. 2, whereby the atom cloud does not exhibit spontaneous emission and the polychromatic laser beam spectrum has an equal amplitude distribution and includes a central field peak.
FIG. 3*b* models the fidelity achieved by a standard monochromatic laser beam and polychromatic laser beams produced by the apparatus of FIG. 2, whereby the atom cloud does not exhibit spontaneous emission and the polychromatic laser beam spectrum has an equal amplitude distribution and does not include a central field peak.
FIG. 3*c* models the fidelity achieved by a standard monochromatic laser beam and polychromatic laser beams produced by the apparatus of FIG. 2, whereby the atom cloud does not exhibit spontaneous emission and the polychromatic laser beam spectrum has a tailored amplitude distribution following a geometric decay, and does not include a central field peak.
FIG. 3*d* models the fidelity achieved by a standard monochromatic laser beam and polychromatic laser beams produced by the apparatus of FIG. 2, whereby the atom cloud exhibits spontaneous emission and the polychromatic laser beam spectrum has an equal amplitude distribution and includes a central field peak.
FIG. 3*e* models the fidelity achieved by a standard monochromatic laser beam and polychromatic laser beams produced by the apparatus of FIG. 2, whereby the atom cloud exhibits spontaneous emission and the polychromatic laser beam spectrum has an equal amplitude distribution and does not include a central field peak.
FIG. 3*f* models the fidelity achieved by a standard monochromatic laser beam and polychromatic laser beams produced by the apparatus of FIG. 2, whereby the atom cloud exhibits spontaneous emission and the polychromatic laser beam spectrum has a tailored amplitude distribution following a geometric decay, and does not include a central field peak.

All field components are also assumed to be in phase $\phi_i = 0$. The parameters for the fidelity responses in the examples shown in FIGS. 3*a* to 3*f* are as follows: the temperature is 1 mK, the total laser power is 100 mW and the cloud-to-beam width ratio is $\sigma_{pos}/\sigma_{beam} = 0.2$. Cloud averaging is therefore not negligible and results in a damping of monochromatic Rabi oscillations with a fidelity clearly below 1 (about 0.75 at its maximum). The comb spacing for the pulsed polychromatic laser beams have been set to be equal to the Rabi frequency of the most central component $\delta\omega = \Omega_{1,0}$. Given that the cloud of atoms is a cloud of Strontium 87 atoms on the 689 nm transition, the polychromatic laser beams have a frequency spacing, dω, is of the order of 100 kHz, and the pulse duration is of the order of $10^{-6}$ s, and preferably in the range of $4\times10^{-6}$ s to $6\times10^{-6}$ s. FIGS. 3*a* to 3*c* do not exhibit spontaneous emission, whereas FIGS. 3*d* to 3*f* are modelled in the presence of spontaneous emission. FIGS. 3*a* and 3*d* are modelled to have a frequency comb including a central field peak (i.e. a peak at the centre frequency) around which the pairs of peaks surround, whereas FIGS. 3*b* and 3*e* are modelled in the absence of a central field peak (i.e. no peak at the centre frequency). FIGS. 3*c* and 3*f* include a power decay between adjacent peaks, with the power for each peak corresponding to 0.7 times the power of the preceding peak. It will of course be understood that these parameters are provided for illustration only, and are specific to these results without limiting the disclosure.

As shown in FIGS. 3*a* to 3*f*, the fidelity that is observed with polychromatic pulses according to the present disclosure is higher than the fidelity achieved with monochromatic pulses (0.75). In particular, the fidelity achieved by the polychromatic light pulses is equal to or greater than 0.95. As shown in FIGS. 3*a* to 3*c*, in the absence of spontaneous emission, setting the frequency comb to include pairs of peaks gives rise to plateaus in which the atoms remain in the excited state before dropping to the ground state at specific times. The sharp transition to the excited state arises from the presence of highly detuned peaks. Detuned peaks here means having a spectrum with peaks arranged across the spectrum, including not only around a centre but also toward the edges of the frequency comb. By providing peaks near the edges of the comb, this effectively means that all atoms within the cloud may be addressed with high fidelity, thereby removing the need for further accounting for effects affecting the dynamics of the cloud in the laser beam. Accordingly, the polychromatic laser beam of the present disclosure can give rise to improved fidelity more quickly than using standard practices. Moreover, the atoms plateau and stay in the excited state. Due to the polychromatic comb structure of the laser beams, the atoms are less sensitive to Doppler-induced frequency shifts, despite the cloud having a finite size and temperature. Additionally, the plateaus exhibited reduce the dephasings due to Rabi frequency inhomogeneities within the cloud. Furthermore, as illustrated by FIGS. 3*a* to 3*f*, the more peaks introduced into the frequency spectrum, the smoother and longer the plateaus in which the atoms stay in the excited state. As shown in FIGS. 3*b* and 3*e*, in the absence of a central field peak, long term damping may be suppressed, which beneficially helps to maintain high fidelity with atoms in the excited state over several Rabi cycles and is therefore especially beneficial for LMT schemes, which involve injecting a plurality of consecutive pulses into a cloud. As shown in FIGS. 3*c* and 3*f*, when a power decay is also introduced between adjacent peaks, the plateaus are smoothened, with the fidelity fluctuations reduced. Accordingly, the fidelity can be improved significantly even when the power is reduced.

In the first example of the disclosure, the waveform generator is configured to generate the input signal to tailor the amplitude distribution of the peaks. In particular, the frequency comb is generated, such that there is a power decay between adjacent peaks. However, the amplitude distribution of the peaks is not limited to this, and in other examples of the disclosure, the frequency comb is generated such that each peak is equal in amplitude.

The polychromatic laser beam has a pulse duration based on the Rabi frequency Ω. In the first example of the present disclosure, the pulse duration approximates to $1/\Omega_{0,0}$ s. Accordingly, the pulse durations do not need to be long to achieve the benefits of high fidelity very rapidly, and are typically much shorter as compared with standard techniques, such as composite-type pulses. The amount of energy required is therefore drastically reduced to achieve high fidelity. However, in some examples of the disclosure, the pulse duration is predetermined according to the amplitude distribution of the peaks, for example by using computer simulations based on the frequency comb.

Figure 4:
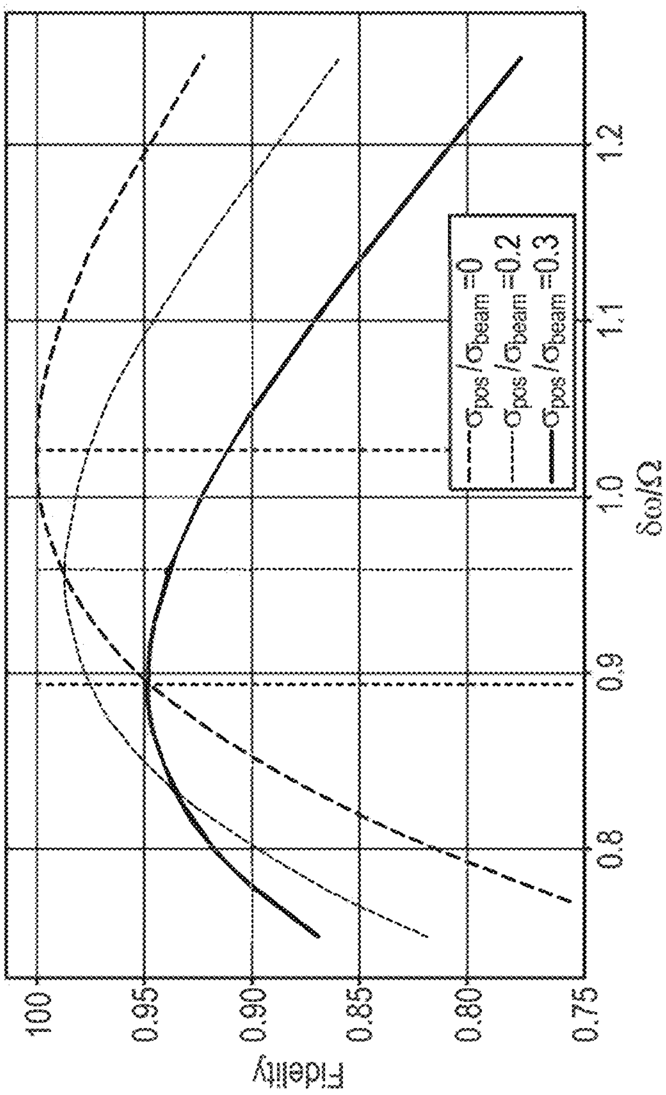
FIG. 4 models the fidelity as a function of a frequency spacing achieved by three polychromatic laser beams having different beam widths, each laser beam having been produced by the apparatus of FIG. 2.

As discussed above, the frequency spacing δω separating each peak from its adjacent peak is determined based on the Rabi frequency Ω of the atomic transition. In particular, it is preferable that the frequency spacing δω is approximately equal to the Rabi frequency Ω, such that a ratio δω/Ω of the frequency spacing to the Rabi frequency is in the range of 0.5 to 1.3 and more preferably approximates to 1. By approximating the ratio δω/Ω to equal 1, the fidelity achieved may be improved. This is illustrated by FIG. 4, which shows the fidelity response of the atom cloud to a polychromatic pulse as a function of the ratio δω/Q, whereby the polychromatic pulse has been generated according to the first example of the disclosure and has the same parameters as in FIG. 3*a* (having ten pairs of peaks including a central frequency component and modelled in the absence of spontaneous emission). FIG. 4 particularly shows how the pulse fidelity is affected when varying the ratio δω/Ω around 1, for three laser beams having different values of the cloud-to-beam width ratio, $\sigma_{pos}/\sigma_{beam}$. As shown in FIG. 4, the pulse fidelity for each laser beam is highest when the ratio δω/Ω is close to 1. For example, as shown in FIG. 4, for the laser beam having $\sigma_{pos}/\sigma_{beam}=0$, the ratio δω/Ω between 0.9-1.2 produces a fidelity equal to or greater than 0.95. For the laser beam having $\sigma_{pos}/\sigma_{beam}=0.2$, the ratio δω/Ω between 0.84-1.09 produces a fidelity equal to or greater than 0.95, and the ratio δω/Ω between 0.8-1.18 produces a fidelity equal to or greater than 0.9. For the laser beam having $\sigma_{pos}/\sigma_{beam}=0.3$, the ratio δω/Ω between 0.77-1.05 produces a fidelity equal to or greater than 0.9. However, even though the fidelity decreases as the ratio δω/Ω departs from 1, the fidelity remains higher than when a standard monochromatic pulse of the prior art is used, which as can be seen from FIG. 3*a* only achieves a fidelity of 0.75. Accordingly, generating the polychromatic laser beam according to the first example of the disclosure improves the fidelity over the monochromatic pulse even when the frequency spacing δω is not exactly equal to the Rabi frequency Ω. However, the disclosure is not limited to this, and in other examples of the disclosure, the frequency spacing δω approximates to an integer multiple of the Rabi frequency Ω of the atomic transition.

It will also be understood that the parameters and results shown in FIGS. 3*a* to 4 are specific to the parameters used, and that under different experimental parameters for different atomic compositions, different specific fidelity values would be achieved, although setting the frequency spacing δω to approximately equal or an integer of the Rabi frequency gives rise to the highest fidelity readings attained by the polychromatic laser beam according to the present disclosure. Furthermore, whilst the polychromatic laser beams in the example of FIGS. 3*a* to 3*f* include 10 pairs of peaks, the disclosure is not limited to this, and the frequency comb may be generated to include any number of peaks that are two or more peaks having a frequency spacing based on the Rabi frequency of the atomic transition.

Figure 5A:
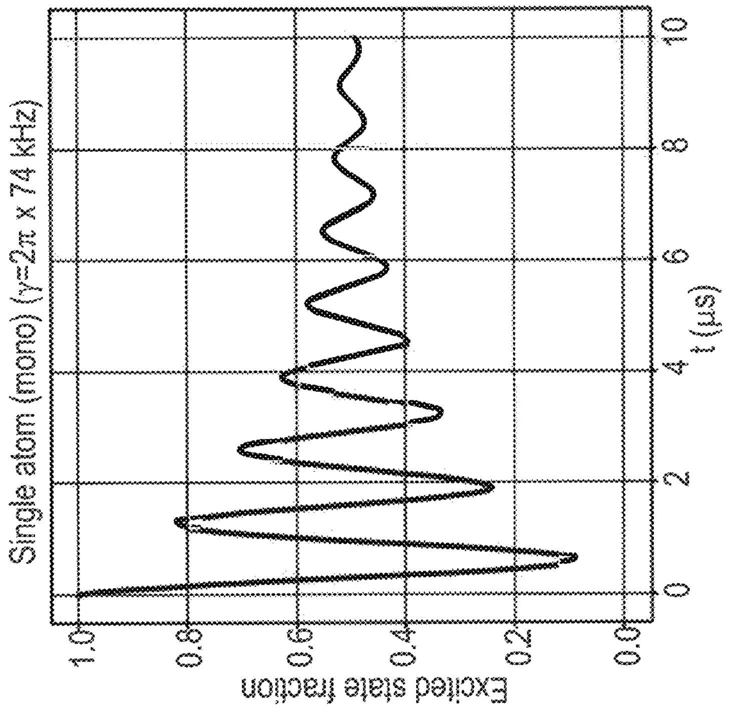
FIG. 5*a* models the dynamics of a two-level atom initially prepared in the excited state in the presence of spontaneous emission as probed by a monochromatic laser beam.
Figure 5B:
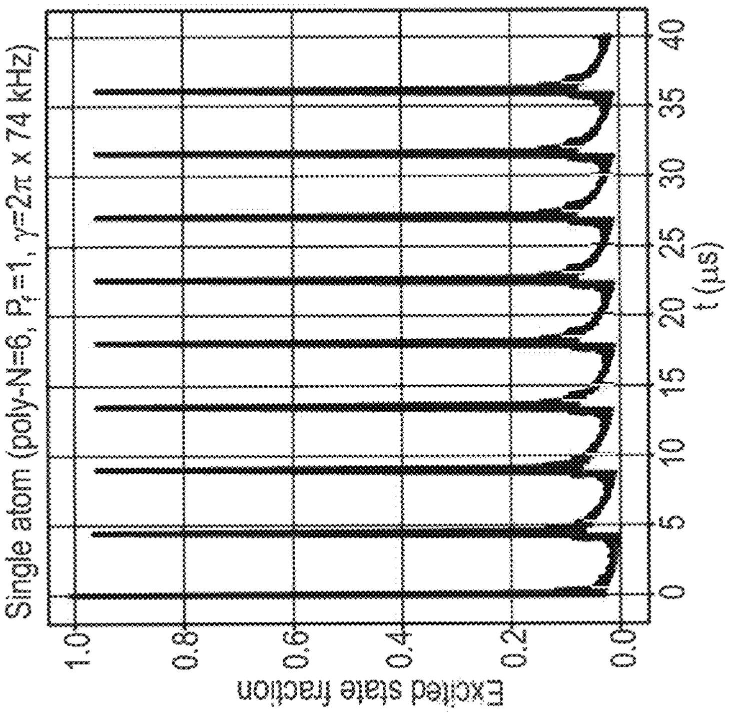
FIG. 5*b* models the dynamics of a two-level atom initially prepared in the excited state in the presence of spontaneous emission as probed by a polychromatic laser beam according to a second example of the disclosure.

The laser beam of the present disclosure has a further advantageous effect of suppressing spontaneous emission when applied to a two-level atom initially prepared in the excited state. As discussed above, spontaneous emission causes atoms to be decoherently lost from the excited state, which is a problem for the purposes of maintaining a strong fringe contrast. Advantageously however, the polychromatic laser beam helps to reduce the rate of spontaneous emission when applied to atoms initially prepared in the excited state, as compared with prior art techniques, and is particularly illustrated in FIGS. 5*a-b*, which model the quantum dynamics of a two-level atom transferring between its ground state and excited state as a function of time, where the atom, prior to being probed by the laser beam, was in the excited state. In particular, FIG. 5*a* models the atom when being probed by a monochromatic laser beam of the prior art. FIG. 5*b* models the atom when being probed by a polychromatic laser beam according to the present disclosure, which has a frequency comb based on the Rabi frequency including six pairs of peaks, no central field peak and a tailored amplitude distribution. As shown in FIG. 5*a*, the monochromatic laser beam fails to significantly reduce the rate of spontaneous emission, which leads to decoherence. This is illustrated in FIG. 5*a*, with the atomic oscillations between the excited and ground states rapidly decaying, so that the atom spends ~50% of the time in the excited state and ~50% of the time in the ground state. By contrast, FIG. 5*b* shows that the polychromatic laser beam helps to successfully suppress spontaneous emission, since the amount of time with which the atom occupies the excited state is significantly reduced. Indeed, it can clearly be seen that after nine consecutive pulses, the polychromatic laser beam successfully drives the atom into the ground state with high probability, and over a period of 40 μs, the atom only spends a matter of nano-seconds intermittently in the excited state. Since the oscillations between the ground state and the excited state decay far more slowly using the polychromatic laser beam than the monochromatic laser beam, the resulting fringe contrast may be improved, thereby leading to greater sensitivity, which is particularly beneficial for devices using long pulse duration sequences, such as in LMT schemes.

Figure 6:
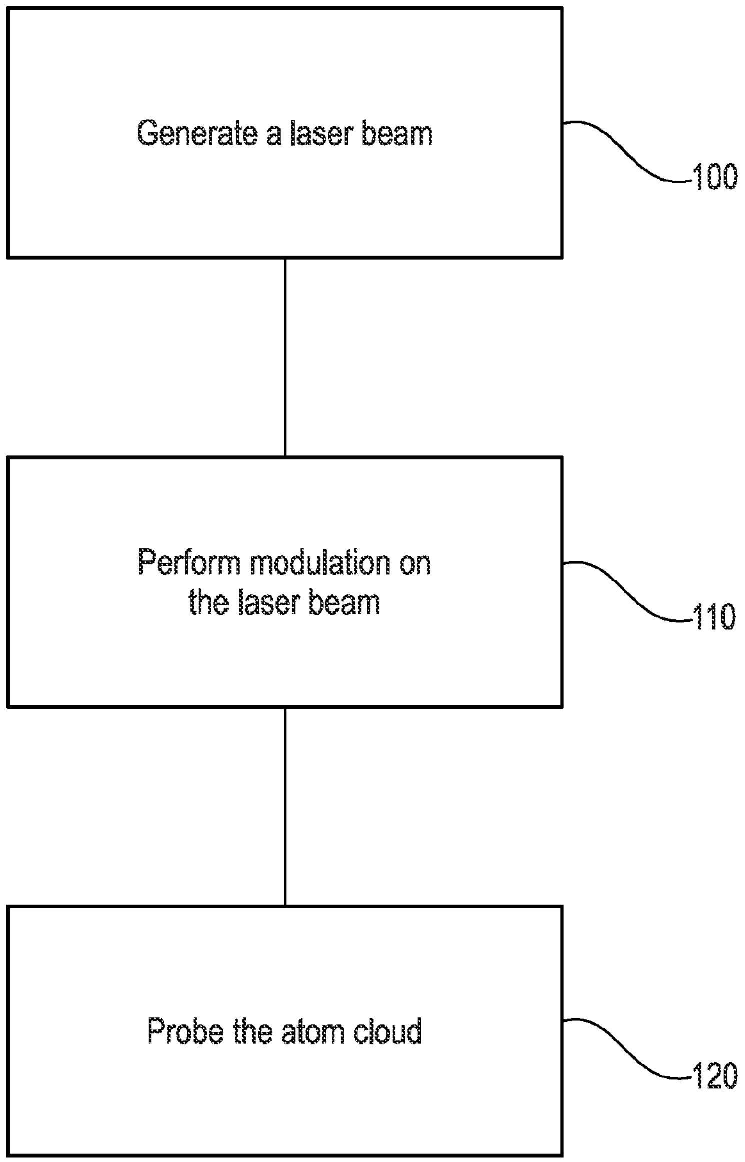
FIG. 6 is a first method according to the present disclosure.

FIG. 6 shows a first example of a method, which may be used in accordance with the apparatus of FIG. 2 to produce the polychromatic results shown in FIGS. 3*a* to 4. The first method includes a first step 100 of generating a laser beam, which is for driving an atom cloud into a targeted quantum state. The laser 22 of FIG. 2 may be used to generate the laser beam. The first method next includes a second step 110 of performing modulation on the laser beam, by directing the laser beam through a modulator configured to perform frequency modulation on the laser beam. The modulator 24 of FIG. 2 may be used to perform the modulation. In order to perform the modulation, an input signal to drive the modulator is generated. The waveform generator 26 of FIG. 2 may be used to generate the input signal to drive the modulation. In particular, the modulator is arranged to perform the frequency modulation based on the input signal to cause the laser beam to include a comb of frequencies around the resonant frequency of the atomic transition of the atoms in the atom cloud. The frequency comb is generated to include a plurality of peaks which are separated by a frequency spacing that is determined based on the Rabi frequency of the atomic transition. As discussed above in relation to FIG. 2, modulating the laser beam in this manner gives rise to a polychromatic spectrum based on the Rabi frequency. In the first method, prior to generating the input signal, a step (not shown) of determining the frequency spacing to be generated is performed. In the first example of the method, the determination of the frequency spacing includes referring to a database that sets out values for the Rabi frequency of a plurality of elements. Based on the composition of the atom cloud to be probed by the laser beam, the determination involves looking up the relevant element to identify the Rabi frequency Ω of the atoms, and setting the frequency spacing δω to approximate to the Rabi frequency Ω. However, the disclosure is not limited to this, and in other examples of the disclosure, a user may identify the Rabi frequency of the atomic transition, and set the frequency spacing δω for example by inputting the value into an input unit of the waveform generator. The first method further includes a third step 120 of probing the atom cloud with the modulated laser beam, which includes the polychromatic frequency comb. In the first method, the atom cloud is prepared before being probed, by using standard cooling techniques. In doing so, the probed atoms can be driven into the targeted quantum state with high fidelity.

In some examples of the disclosure, the apparatus is implemented as a gravity sensor or an atomic interferometer. The disclosure however is not limited to these implementations, and the apparatus may be used in any device for performing high fidelity atom optics.

In further examples of the disclosure, the method includes a step of preparing the atoms in the excited state prior to being probed by the laser beam. The atoms may be provided in the excited state using any suitable means. In doing so, when the laser beam probes the atoms, the atoms may be driven into the targeted quantum state, not only with high fidelity but also whilst suppressing spontaneous emission, which is particularly advantageous for long sequence LMT schemes.

Whilst the disclosure has been described in use with a cloud of Strontium 87 atoms on the 689 nm transition, it will be understood that the disclosure may be adapted to any atomic species. For example, polychromatic laser beams may be used to probe a cloud of Rubidium 87 atoms, whereby the frequency spacing is based on the Rabi frequency driving the Rubidium 87 atomic transition. In particular, when driving the Rb 87 transition, the frequency spacing, δω, may be of an order of magnitude of 100 kHz, and the pulse duration may be of an order of $10^{-6}$ s. When driving the Sr 87 atomic transition at 698 nm, the frequency spacing, δω, may be of an order of magnitude of 1 kHz and the pulse duration may be of an order of $100\times10^{-6}$ s.

There is provided an apparatus (20) for driving atoms of an atom cloud (28) into a targeted quantum state, the apparatus (20) comprising: an atom source for releasing a cloud of atoms (28) to be driven into a targeted quantum state; a laser system (22) configured to generate a laser beam to be directed onto the atom cloud (28) in use, the laser beam having a frequency corresponding to a resonant frequency of an atomic transition for exciting the atoms into the targeted quantum state; a modulator (24) configured to, in use, modulate the frequency of the laser beam responsive to an input signal; a waveform generator (26) coupled to the modulator (24) and configured to, in use, generate an input signal for the modulator (24), wherein the input signal is arranged to cause the modulator (24) to modulate the laser light to generate a comb of frequencies around the resonant frequency of the atomic transition, the frequency comb including a plurality of peaks, each peak being separated by a frequency spacing, Ow, that is determined based on a Rabi frequency, Ω, of the atomic transition to drive atoms of the atom cloud (28) into a targeted quantum state.

There is provided a method for driving atoms of an atom cloud into a targeted quantum state, the method comprising: generating (100) a laser beam to be directed onto an atom cloud to be driven into a targeted quantum state, the laser beam having a frequency corresponding to a resonant frequency of an atomic transition for exciting the atoms into the targeted quantum state; directing the laser beam through a modulator configured to modulate the frequency of the laser beam responsive to an input signal; generating an input signal input into the modulator to cause the modulator to modulate (110) the laser light to generate a comb of frequencies around the resonant frequency of the atomic transition, the frequency comb including a plurality of peaks, each peak being separated by a frequency spacing that is determined based on a Rabi frequency of the atomic transition; and probing (120) an atom cloud with the modulated laser beam for driving atoms of the atom cloud into a targeted quantum state.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating a plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Apparatus for driving atoms of an atom cloud into a targeted quantum state, the apparatus comprising:

an atom source for releasing an atom cloud to be driven into a targeted quantum state;

a laser system configured to generate a laser beam to be directed onto the atom cloud in use, the laser beam having a frequency corresponding to a resonant frequency of an atomic transition for exciting the atoms into the targeted quantum state;

a modulator configured to, in use, modulate the frequency of the laser beam responsive to an input signal;

a waveform generator coupled to the modulator and configured to, in use, generate the input signal for the modulator, wherein the input signal is arranged to cause the modulator to modulate the laser beam to generate a comb of frequencies around the resonant frequency of the atomic transition, the frequency comb including a plurality of peaks, each peak being separated by a frequency spacing, $\delta\omega$, that is determined based on a Rabi frequency, $\Omega$, of the atomic transition to drive atoms of the atom cloud into the targeted quantum state.

2. The apparatus of claim 1, wherein the frequency spacing, $\delta\omega$, between each peak is equal.

3. The apparatus of claim 1, wherein the frequency spacing, $\delta\omega$, is determined to be an integer multiple of the Rabi frequency, $\Omega$.

4. The apparatus of claim 1, wherein the plurality of peaks is even in number.

5. The apparatus of claim 1, wherein the frequency comb includes no peak at a centre frequency of the frequency comb.

6. The apparatus of claim 1, wherein the peaks have a predetermined amplitude distribution.

7. The apparatus of claim 6, wherein each peak is equal in amplitude.

8. The apparatus of claim 6, wherein the amplitude distribution includes a power decay between adjacent peaks.

9. The apparatus of claim 1, wherein the laser beam is a pulsed laser beam.

10. The apparatus of claim 9, wherein the pulsed laser beam has a pulse duration of an order of $1/\Omega$ s.

11. The apparatus of claim 1, wherein the laser beam is for driving atoms into the targeted quantum state with a higher fidelity than a fidelity achieved by a monochromatic laser beam, wherein the fidelity is defined as the maximum population transfer of atoms of the atom cloud being driven into the targeted quantum state.

12. The apparatus of claim 1, wherein the laser beam is for robustly driving atoms into the targeted quantum state.

13. The apparatus of claim 1, wherein the laser beam is for driving atoms from the ground state into the excited state.

14. The apparatus of claim 1, wherein the laser beam is for driving atoms from the excited state into the ground state.

15. The apparatus of claim 1, wherein the atoms are arranged to be in the excited state, prior to being probed by the laser beam, and wherein the laser beam is for driving the atoms, arranged in the excited state prior to being probed by the laser beam, into the targeted quantum state with a lower rate of spontaneous emission than a rate of spontaneous emission produced by a monochromatic laser beam.

16. The apparatus of claim 1, wherein the modulator comprises an acousto-optical modulator, AOM.

17. The apparatus of claim 1, wherein the waveform generator comprises an arbitrary waveform generator, AWG, configured to output a radio frequency, RF, signal for determining the frequency modulation of the modulator.

18. The apparatus of claim 1, further comprising a spectrum analyser.

19. The apparatus of claim 1, wherein the atom cloud is cooled before being probed with the laser beam.

20. The apparatus of claim 1, wherein the atom cloud is driven by the laser beam in a non-cavity environment.

21. The apparatus of claim 1, wherein the laser beam is generated to have a power equal to or less than 1 W.

22. The apparatus of claim 1, wherein a single laser pulse is configured to drive the atoms into the targeted quantum state, wherein the laser pulse is configured to have a pulse duration of an order of $1/\Omega$ s.

23. The apparatus of claim 1, wherein the atom source comprises a cloud of Rubidium 87 atoms.

24. The apparatus of claim 23, wherein the frequency spacing, $\delta\omega$, is of an order of magnitude of 100 kHz.

25. The apparatus of claim 23, wherein the laser beam is for driving atoms into the targeted quantum state with a fidelity equal to or greater than 0.8, and preferably equal to or greater than 0.95.

26. The apparatus of claim 1, wherein the pulse duration is of the order of $10^{-6}$ s.

27. The apparatus of claim 1, wherein the atom source comprises a cloud of Strontium 87 atoms.

28. The apparatus of claim 27, wherein the laser beam is for driving the atomic transition at 689 nm, wherein the frequency spacing, $\delta\omega$, is of an order of magnitude of 100 kHz, and the pulse duration is of an order of $10^{-6}$ s.

29. The apparatus of claim 27 wherein the laser beam is for driving the atomic transition at 698 nm, wherein the frequency spacing, δω, is of an order of magnitude of 1 kHz, and the pulse duration is of an order of $100\times10^{-6}$ s.

30. The apparatus of claim 1, wherein the frequency spacing, δω, is less than 1 MHz.

31. An atomic interferometer comprising the apparatus of claim 1.

32. A gravity sensor comprising the apparatus of claim 1.

33. A method for driving atoms of an atom cloud into a targeted quantum state, the method comprising:

generating a laser beam to be directed onto an atom cloud to be driven into the targeted quantum state, the laser beam having a frequency corresponding to a resonant frequency of an atomic transition for exciting the atoms into the targeted quantum state;

directing the laser beam through a modulator configured to modulate the frequency of the laser beam responsive to an input signal;

generating the input signal input into the modulator to cause the modulator to modulate the laser beam to generate a comb of frequencies around the resonant frequency of the atomic transition, the frequency comb including a plurality of peaks, each peak being separated by a frequency spacing that is determined based on a Rabi frequency of the atomic transition; and probing an atom cloud with the modulated laser beam for driving atoms of the atom cloud into the targeted quantum state.

34. The method of claim 33, further comprising, prior to generating the input signal, determining the frequency spacing of the frequency comb to be generated, wherein the frequency spacing is determined based on a Rabi frequency of the atomic transition.

35. The method of claim 33, further comprising, prior to generating the input signal, determining an amplitude distribution for the plurality of peaks, wherein the input signal is generated based on the determined amplitude distribution.

36. The method of claim 33, further comprising, by probing the atom cloud, driving the atom cloud into the targeted quantum state with a higher fidelity than a fidelity achieved by a monochromatic laser beam, wherein the fidelity is defined as the maximum population transfer of atoms of the atom cloud being driven into the targeted quantum state.

37. The method of claim 33, further comprising, by probing the atom cloud, driving the atom cloud from a ground state into an excited state.

38. The method of claim 33, further comprising, by probing the atom cloud, driving the atom cloud from the excited state into the ground state.

39. The method of claim 33, further comprising, prior to probing the atom cloud, providing the atoms in the excited state.

40. The method of claim 39, further comprising, by probing the atom cloud, driving the atom cloud into the targeted quantum state with a lower rate of spontaneous emission than a rate of spontaneous emission produced by a monochromatic laser beam.

41. The method of claim 33, further comprising, prior to probing the atom cloud, cooling the atom cloud.

* * * * *